United States Patent

[11] 3,583,618

[72] Inventor Richard A. Lewis
Sherman Oaks, Calif.

[21] Appl. No. 858,045
[22] Filed Sept. 15, 1969
[45] Patented June 8, 1971
[73] Assignee Astro-Science Corporation
South El Monte, Calif.

[54] DUAL CAPSTAN DRIVE SYSTEM
9 Claims, 3 Drawing Figs.

[52] U.S. Cl. ........ 226/49, 74/220, 226/108, 226/188, 226/195
[51] Int. Cl. ........ B65h 17/20
[50] Field of Search ........ 226/49, 51, 108, 111, 188, 195; 74/219, 220

[56] References Cited

UNITED STATES PATENTS

| | | | |
|---|---|---|---|
| 3,257,515 | 6/1966 | Nakamatsu | 226/49X |
| 3,421,674 | 1/1969 | McCammon | 226/195 |
| 3,447,729 | 6/1969 | Cass | 226/188X |

*Primary Examiner*—Richard A. Schacher
*Attorney*—Jessup & Beecher

ABSTRACT: Improved magnetic recording apparatus of the dual capstan type is provided, and particularly an improved magnetic tape transport mechanism has been devised for use in such apparatus, and which includes a reversible drive motor and a belt-coupling system between the motor and the two capstans to cause the lead capstan to be rotated at a slightly higher speed than the other capstan, regardless of the direction of movement of the tape, so as to maintain a certain minimum tape tension across the transducer heads of the recording apparatus at all times.

INVENTOR:
Richard A. Lewis
By Jessup and Beecher
Warren T. Jessup
ATTORNEYS

DUAL CAPSTAN DRIVE SYSTEM

BACKGROUND OF THE INVENTION

The use of magnetic wire as a means for recording and reproducing audio signals was first demonstrated over 70 years ago. However, it is only within the last 20 to 30 years that theories, techniques and materials have been developed which make possible the reproduction of audio and other signals with high quality, and with a sufficiently high frequency range, high signal-to-noise ratio, and lack of distortion, so as to enable magnetic recording to assume a prominent position in the art. At present, the most widely used magnetic recording medium is the magnetic tape, which consists of a paper or plastic base coated with a thin layer of iron oxide.

Most magnetic recorders include a payoff reel and a takeup reel, and the magnetic tape is moved by a tape transport mechanism from the payoff reel to the takeup reel. The tape is so moved across the various transducer heads which make up the recording and reproducing apparatus. It is also usual in some instances, to provide a drive capstan which cooperates with a pinch roller to draw the tape across the transducer heads. In some cases, and where extremely high quality is desired, a second drive capstan is provided, so that drive capstans are respectively disposed on either side of the transducer heads. These two drive capstans assure that the tape is transported with uniform and constant velocity across the heads.

In order to maintain the record and reproduce quality required by present day magnetic recorders, it is necessary in the aforesaid dual capstan type of tape transport for the two capstans to be driven at slightly different speeds, so as to maintain the tape in constant tension and at constant speed as it is drawn across the recording and reproducing transducer heads. The need for such constant tension and speed in the tape has long been known in the art, and many ingenious drive systems have been provided in the past to meet such criteria. These prior-art drive systems include, for example, multiple-motor systems, slip clutch systems, spring-biased reel systems, and others.

Although certain advantages are inherent in each of the various types of prior-art systems enumerated in the preceding paragraph, they all require duplicate parts, and are for the most part exceedingly expensive and complicated. In addition, many of the prior-art mechanisms are objectionable in that difficulties are encountered in changing reels, since the magnetic tape must be reeled around a tortuous path about several drums or pulleys.

In many tape recorders, it is desirable for the tape to operate in both directions, instead of merely in one direction. Many of the prior-art dual capstan type systems mentioned above, although satisfactorily providing the desired constant tension of the tape when the tape is drawn in one direction, are incapable of providing such constant tension when the tape is driven in the opposite direction. One important object of the present invention is to provide an improved and simplified belt drive system for the dual capstan type of tape transport mechanism, which is so constituted that the leading capstan is driven at a slightly higher speed than the trailing capstan, regardless of the direction of movement of the tape. In this way, the tape is maintained under appropriate tension as it is drawn across the transducer head, regardless of the direction in which it is moving.

The tape transport mechanism of the invention, therefore, may be used in dual capstan recorders, and in various types of film-handling devices; and it functions to drive the capstans at slightly different speeds, so that the leading or pulling capstan has a higher surface velocity than the lagging or input capstan, regardless of the direction of the movement of tape. This produces a stretching of the magnetic tape between the two capstans, as the tape is drawn across the transducer heads, and it creates a higher tension on that part of the tape than on the other parts. This technique assures that the tape will be drawn at constant speed across the transducer heads.

In the bidirectional type of magnetic recorders mentioned earlier herein, that is in recorders which are constructed to record and play back in both directions of movement of the tape, the velocity relationship between the two capstans must be reversed when the tape direction is reversed. The tape transport mechanism to be described provides a simple belt-coupling system which accomplishes this result. A primary advantage of the system to be described is that it reduces the number of rotating assemblies in the mechanism to a minimum, and utilizes simple and readily available drive belts.

DETAILED DESCRIPTION OF THE ILLUSTRATED EMBODIMENTS

Figures 1, 2:
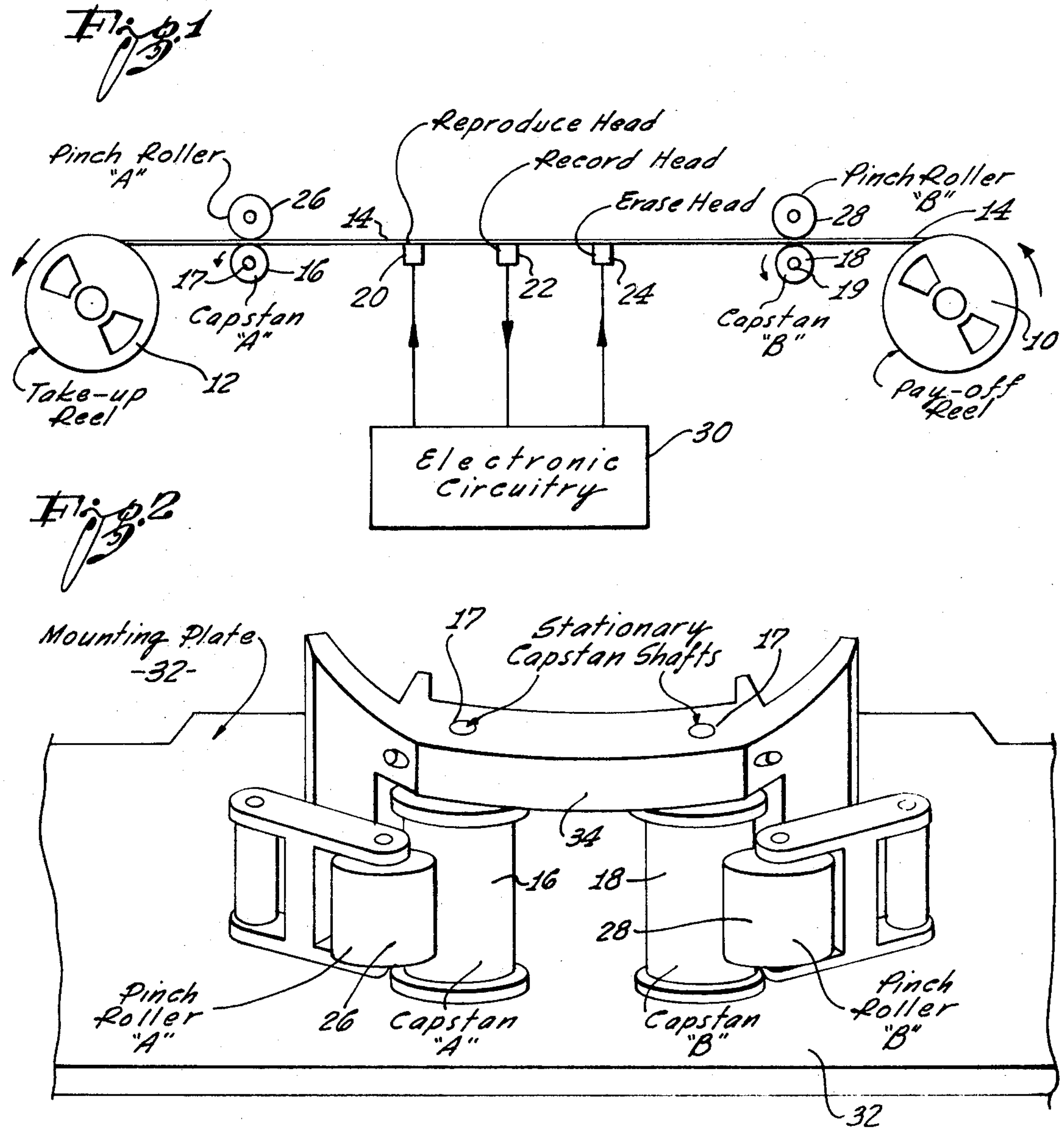
FIG. 1 is a schematic representation of a dual capstan type of tape recorder, and which includes first and second capstans designated capstan "A" and capstan "B" which may be driven by the improved and simple belt drive system of the invention.
FIG. 2 is a perspective representation of a portion of a tape recorder showing the relationship between the two capstans "A" and "B," and the manner in which the capstans may be mounted on a mounting plate and engaged by cooperating pinch rollers.

The tape recorder shown schematically in FIG. 1 includes a payoff reel 10 and a takeup reel 12. The two reels are mounted on an appropriate chassis, and are driven in such a manner that a flexible elongated weblike member, such as a magnetic tape 14, may be drawn from the payoff reel 10 and along a tape path to the takeup reel 12. In the recorder shown in FIG. 1, the tape is drawn along the tape path by means of a first capstan 16 designated capstan "A," and by means of a second capstan 18 designated capstan "B." A group of magnetic transducer heads is positioned between the capstans 16 and 18, and these heads may include, for example, a reproduce head 20, a record head 22 and an erase head 24. A first pinch roller 26 designated pinch roller "A" is associated with the capstan 16, and second pinch roller 28 designated pinch roller "B," associated with the capstan 18.

During the operation of the tape recorder shown in FIG. 1, the takeup reel 12 may be driven at a particular speed, so that the tape drawn from the payoff reel 10 by the capstans 16 and 18 may be reeled up onto the takeup reel 12. The capstans 16 and 18 are driven at a slightly different speeds in a manner to be described, and when their associated pinch roller 26 and 28 are moved down against the magnetic tape 14, so as to squeeze the tape 14 against the capstans, the capstans cause the tape to be drawn from the payoff reel 10 and past the transducer heads 20, 22 and 24.

As mentioned above, it is desirable for the capstan 16 to be driven at a slightly higher speed than the capstan 18. This is to assure that the portion of the magnetic tape 14 drawn across the transducer heads 20, 22 and 24 may be held under tension, and move at a constant and invariable rate. The resulting signals derived from, and introduced to, the various heads 20, 22 and 24 are processed in any known type of electronic circuitry 30, in a manner well understood in the art.

As described above, the tape transport mechanism of the present invention is particularly concerned with bidirectional tape recorders in which the magnetic tape may be driven in one direction. When the tape is driven, for example, from the right towards the left in FIG. 1, the improved mechanism of the invention provides that the capstan 16 be driven at a slightly higher speed than the capstan 18 so as to maintain constant tension on the portion of the tape drawn across the transducer heads 20, 22 and 24. Then, when the magnetic tape 14 is driven in a direction from left to right in FIG. 1, the mechanism of the invention provides that the capstan 18 is driven at a slightly higher speed than the capstan 16 so as to maintain the constant tension of the aforesaid portion of the tape.

The pinch rollers 26 and 28, and the corresponding capstans 16 and 18 ("A" and "B") may be mounted on a mounting plate 32, as shown in FIG. 2, with an appropriate stationary bridge 34 being provided to maintain the shafts 17 and 19 of the capstans 16 and 18 in a rigid stationary position. The pinch rollers 26 and 28 may be mounted, as shown in FIG. 2, to be selectively turned against the corresponding capstans 16 and 18, in order to pinch the tape 14 between the capstans and the pinch rollers when the tape is to be driven. Suitable spring-biased mechanisms, not shown, may be used selectively to swing the pinch rollers 26 and 28 against the tape, and this mechanism may incorporate appropriate electrically activated solenoids.

Figure 3:
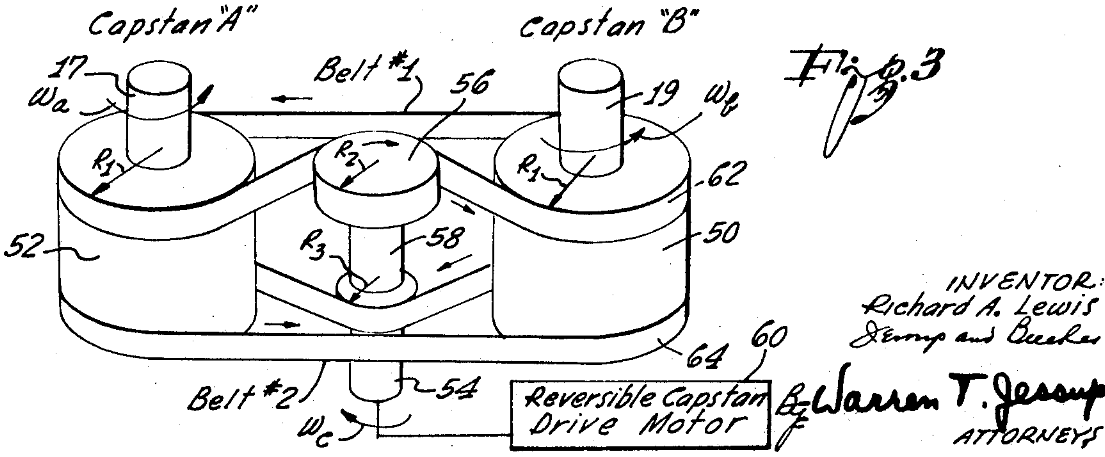
FIG. 3 is a perspective and somewhat schematic representation of the belt drive system of the invention, sued to couple a reversible capstan motor to the two capstans "A" and "B."

The drive mechanism for the capstan drive shafts 17 and 19 is shown in FIG. 3. A drum 50 is keyed to the shaft 19, and a drum 52 of the same diameter as the drum 50 is keyed to the shaft 17. The drums 50 and 52 may each be considered to have a radius $R_1$. A central drive shaft 54 is rotatably mounted in appropriate bearings (not shown) between the shafts 17 and 19, and a pair of pulleys 56 and 58 are keyed to the shaft 54 and axially spaced along the shaft.

The pulleys 56 may have a larger diameter $R_2$ than the pulley 58, which may have a diameter $R_3$. The shaft 54 is driven, for example, by means of a reversible capstan drive motor designated by the block 60. A first elastic belt 62 couples the pulley 56 to the drums 50 and 52 in the manner shown in FIG. 3, and a second elastic belt 64 couples the pulley 58 to the drums 50 and 52 in the manner shown in FIG. 3. The belts 62 and 64 may be formed of any appropriate resilient material.

When the drive shaft 54 is rotated at a speed $\omega_c$ in the direction of the arrow of FIG. 3, for example, the two pulleys 56 and 58 attempt to drive the shafts 17 and 19 at different speeds. It can be shown mathematically that, because of the elastic nature of the belts, when the shaft 54 is rotated at the speed $\omega_c$ in the direction of the arrow, the two shaft 17 and 19 will rotate at different speeds $\omega_a$ and $\omega_b$ in the same direction, as indicated by the arrows. The speed of each of the shafts 17 and 19 will favor the speed determined by the ratio of its drum 50 or 52 to the radius of the pulley 56 or 58 which is pulling it. When the direction of rotation of the shaft 54 is reversed, the relationship of the pulleys 56 and 58, and drums 50 and 52, will also be reversed. That is, the pulley that was pulling the drum 52 will be pulling the drum 50 and vice versa.

In FIG. 3, if the shaft 54 is rotated in the direction shown by the arrow, the shaft 17 will rotate at a speed $\omega_a \approx \omega_c$"$R_2/R_1$); and the shaft "B" will rotate at a speed $\omega_b \approx \omega_c(R_3/R_1)$. The shafts 17 and 19 will rotate in a direction opposite to the shaft 54, as shown by the arrows, and this rotation of the shafts 17 and 19 will cause the tape 14 to be driven in a direction from the right to the left in FIG. 3. Also, it will be appreciated that since the radius $R_2$ is greater than the radius $R_3$, the shaft 17 will be driven at a slightly higher speed than the shaft 19. However, if the direction of rotation of the shaft 54 is reversed, the opposite effect takes place, and the shaft 19 is rotated at a slightly higher speed than the shaft 17, with the rotations of the shafts 17 and 19 being reversed so as to draw the tape from the left to the right in FIG. 3.

It will be appreciated, therefore, that the simple differential coupling belt system shown in FIG. 3 provides for a reversible bidirectional recording transport, this being achieved without clutches or other selectively engaging and disengaging parts. The mechanism of the invention operates in a simple and straightforward manner, so that when the capstan drive motor 60 is energized to drive the magnetic tape 14 in a first direction the capstan "A" is driven at a slightly higher speed than the capstan "B"; and, when the capstan drive motor 60 is reversed to drive the tape in the opposite direction, the capstan "B" is automatically driven at a slightly higher speed than the capstan "A." Therefore, the desired tensioning is achieved of the portion of the magnetic tape drawn across the transducer heads, and regardless of the direction of movement of the tape.

What I claim is:

1. A mechanism for providing a bidirectional drive for an elongated flexible weblike member along a particular path and for creating a tension in the weblike member as it is drawn along said path, said mechanism including:
   - a first rotatably mounted drive member for said weblike member;
   - a second rotatably mounted drive member for said weblike member spaced along said path from said first drive member;
   - first and second drums mechanically coupled to said first and second drive members respectively;
   - drive means including first and second pulleys;
   - a first resilient belt extending around a peripheral portion of said first pulley and around said drums; and
   - a second resilient belt extending around a peripheral portion of said second pulley and around said drums.

2. The mechanism defined in claim 1 in which said first and second drums have equal radii and said first and second pulleys have different radii.

3. The mechanism defined in claim 2, in which said first drive member includes a first shaft, said second drive member includes a second shaft parallel to said first shaft, said drive means includes a drive shaft disposed between said first and second shafts and parallel thereto, said equal-radii drums being mounted on said first and second shafts respectively, and said different-radii pulleys being mounted on said drive shaft and spaced at axial positions therealong.

4. The mechanism defined in claim 3, and which includes reversible electric motor means mechanically coupled to said drive shaft.

5. The mechanism defined in claim 1, in which said first and second drive members comprise first and second capstans disposed adjacent the path of said flexible weblike member.

6. The mechanism defined in claim 1, in which said weblike member comprises a magnetic tape.

7. A mechanism for providing a bidirectional drive including:
   - a first rotatable drive member;
   - a second rotatable drive member spaced from said first drive member;
   - first and second drums mechanically coupled to said first and second drive members respectively;
   - drive means including first and second pulleys;
   - a first resilient belt extending around a peripheral portion of said first pulley and around said drums; and
   - a second resilient belt extending around a peripheral portion of said second pulley and around said drums.

8. The mechanism defined in claim 7 in which said first and second drums have equal radii and said first and second pulleys have different radii.

9. The mechanism defined in claim 8 in which said first resilient belt and said second resilient belt extend as closed loops around said drums, and in which said first pulley and second pulley are positioned outside of the loops and engaging said first and second resilient belts respectively on opposite sides of the closed loops.